(12) United States Patent
Ross et al.

(10) Patent No.: US 7,639,858 B2
(45) Date of Patent: Dec. 29, 2009

(54) CURRENCY VALIDATION

(75) Inventors: Gary A. Ross, Fife (GB); Chao He, Paisley (GB); Mark A. Girolami, Glasgow (GB)

(73) Assignee: NCR Corporation, Dayton, OH (US)

( * ) Notice: Subject to any disclaimer, the term of this patent is extended or adjusted under 35 U.S.C. 154(b) by 649 days.

(21) Appl. No.: 10/850,755

(22) Filed: May 21, 2004

(65) Prior Publication Data
US 2004/0247169 A1      Dec. 9, 2004

(30) Foreign Application Priority Data
Jun. 6, 2003   (GB)   ................... 0313002.8

(51) Int. Cl.
*G06K 9/00* (2006.01)
(52) U.S. Cl. ................. 382/135; 382/209; 382/224; 356/71
(58) Field of Classification Search ................. 382/135, 382/209, 224; 356/71
See application file for complete search history.

(56) References Cited

U.S. PATENT DOCUMENTS

| | | | |
|---|---|---|---|
| 4,041,456 A | | 8/1977 | Ott et al. |
| 5,633,949 A | | 5/1997 | Graves et al. |
| 5,729,623 A | * | 3/1998 | Omatu et al. ............... 382/155 |
| 6,247,573 B1 | * | 6/2001 | Itako et al. ................. 194/202 |
| 6,453,061 B1 | * | 9/2002 | Neri et al. ................... 382/135 |
| 6,474,548 B1 | * | 11/2002 | Montross et al. ............ 235/379 |
| 6,539,104 B1 | | 3/2003 | Raterman et al. |
| 6,798,900 B1 | * | 9/2004 | Sugata ........................ 382/137 |
| 2001/0043140 A1 | | 11/2001 | Ross |
| 2002/0044677 A1 | * | 4/2002 | Fox ............................. 382/135 |

FOREIGN PATENT DOCUMENTS

| | | | |
|---|---|---|---|
| EP | 1 246 164 A1 | 10/2002 |
| GB | 2 062 854 A | 5/1981 |
| GB | 2 361 765 A | 10/2001 |

OTHER PUBLICATIONS

Carson et al., "Blobworld: Image Segmentation Using Expectation-Maximization and Its Application to Image Querying", Aug. 2002, IEEE Transactions on Pattern Analysis and Machine Intelligence, vol. 24, No. 8, 1026-1038.*

(Continued)

*Primary Examiner*—Brian P Werner
*Assistant Examiner*—Katrina Fujita
(74) *Attorney, Agent, or Firm*—Priest & Goldstein PLLC

(57) ABSTRACT

A method for developing a template of a reference document, such as a bank note and using that template to validate other test documents. The method involves using images of a plurality of reference documents, such as banknotes and segmenting each image in a like manner into a plurality of segments. Each segment is then classified using a one-class classifier to determine a reference classification parameter. These parameters are used to define a threshold reference classification parameter. Optionally, the step of segmenting is optimized to determine a preferred number of segments, and a preferred combination of these for use in a subsequent validation process. Preferably, this is done using a stochastic algorithm such as a genetic algorithm.

20 Claims, 8 Drawing Sheets

OPTIMIZED NOTE SEGMENTATION AND CLASSIFIER
COMBINATION FOR D² TEST (SEARCH SPACE: (3,3))

OTHER PUBLICATIONS

He et al.,"Employing optimized combinations of one-class classifiers for automated currency validation",Pattern Recognition,Elsevier,Kidlington,GB,vol. 37,No. 6,Apr. 9, 2004,pp. 1085-1096, 'Online!Jun. 27, 2003,pp. 1-33,retrieved from Internet:URL:http://cis.paisley.ac.uk/ research/reports/he—ic0/publication/NCR_PRL2003.pdf>,'retrieved Aug. 17, 2005!.

Tax et al., "Support vector domain description", Pattern Recognition Letters, North-Holland Publ. Amsterdam, NL. vol. 20, No. 11-13, Nov. 1999, pp. 1191-1199.

Buxton et al., "Data Fusion by Intelligent Classifier Combination", Measurement and Control, 'Online! vol. 34, No. 8, Oct. 2001, pp. 229-234, retrieved from Internet: URL:http://www.cs.ucl.ac.uk/staff/W.Langdon/mc/>, 'retrieved Aug. 22, 2005!.

Manevitz et al., "One-Class SVMs for Document Classification", Journal of Machine Learning Research, vol. 2, Dec. 2001, pp. 139-154.

* cited by examiner

EFFECTIVE REGION OF BOS 10 POUND NOTE

FIG. 5

ONE-CLASS D² TEST AND MOG + BOOTSTRAP TEST BY USING THE WHOLE NOTE

| | $D^2$ TEST | | MOG + BOOTSTRAP | |
|---|---|---|---|---|
| α | FN | FP | FN | FP |
| 0.01 | 26.94 % | 0.75 % | 18.17 % | 0.99 % |
| 0.05 | 16.42 % | 4.45 % | 8.77 % | 5.14 % |
| 0.10 | 11.15 % | 9.95 % | 5.76 % | 10.10 % |

FIG. 6

TWO-CLASS DISCRIMINATORS APPLIED TO SINGLE VECTOR DESCRIPTIONS OF A WHOLE NOTE

| | TWO-CLASS GAUSSIAN DISCRIMINATOR | TWO-CLASS MOG DISCRIMINATOR |
|---|---|---|
| FN | 11.90 % | 10.03 % |
| FP | 3.97 % | 3.25 % |

OPTIMIZED NOTE SEGMENTATION AND CLASSIFIER
COMBINATION FOR $D^2$ TEST (SEARCH SPACE: (3,3))

TEST RESULTS ON THE OPTIMIZED NOTE SEGMENTATION (OPT_SEG) AND
CLASSIFIER COMBINATION (OPT_COMB) USING LOCAL $D^2$ TESTS AT THE
1% SIGNIFICANCE LEVEL

| $\alpha$ | $R_{MAX}$ | $C_{MAX}$ | OPT_SEG | OPT_COMB | GA TRAINING SET | | INDEPENDENT TEST SET | |
|---|---|---|---|---|---|---|---|---|
| | | | | | FN | FP | FN | FP |
| 0.01 | 3 | 3 | 3 x 3 | $D_4, D_6$ | 8.67 % | 1.68 % | 5.02 % | 1.46 % |
| 0.01 | 7 | 7 | 1 x 6 | $D_2, D_5, D_6$ | 5.67 % | 2.88 % | 2.41 % | 3.03 % |
| 0.01 | 15 | 15 | 1 x 11 | $D_2, D_8, D_{11}$ | 4.00 % | 3.24 % | 4.02 % | 3.16 % |

OPTIMIZED NOTE SEGMENTATION AND CLASSIFIER
COMBINATION FOR $D^2$ TEST (SEARCH SPACE: (7, 7))

OPTIMIZED NOTE SEGMENTATION AND CLASSIFIER
COMBINATION FOR $D^2$ TEST (SEARCH SPACE: (15, 15))

FIG. 11

TEST RESULTS ON THE OPTIMIZED NOTE SEGMENTATION (OPT_SEG) AND CLASSIFIER COMBINATION (OPT_COMB) USING LOCAL MOG + BOOTSTRAP TESTS AT THE 1% SIGNIFICANCE LEVEL

| $\alpha$ | $R_{MAX}$ | $C_{MAX}$ | OPT_SEG | OPT_COMB | GA TRAINING SET | | EXTRA TESTING SET | |
|---|---|---|---|---|---|---|---|---|
| | | | | | FN | FP | FN | FP |
| 0.01 | 3 | 3 | 2 x 3 | $D_3, D_4, D_6$ | 5.67 % | 2.96 % | 4.82 % | 5.22 % |
| 0.01 | 7 | 7 | 7 x 3 | $D_{12}, D_{13}$, | 3.67 % | 1.88 % | 2.61 % | 1.46 % |
| 0.01 | 15 | 15 | 4 x 11 | $D_{18}, D_{22}, D_{24}$ | 0.67 % | 2.64 % | 2.81 % | 2.79 % |

FIG. 12

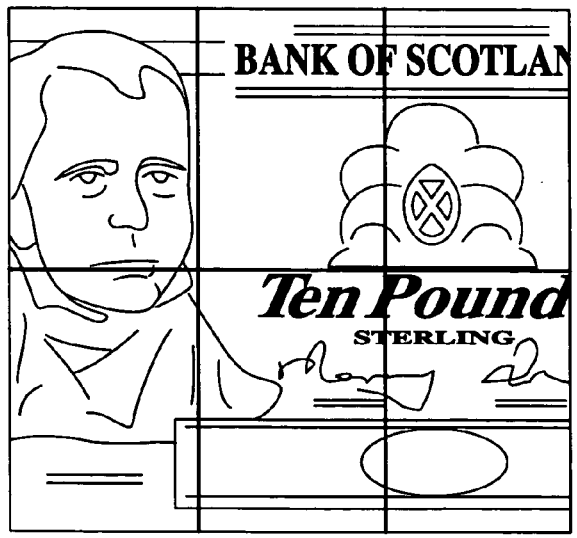

OPTIMIZED NOTE SEGMENTATION AND CLASSIFIER COMBINATION FOR MOG + BOOTSTRAP TEST (SEARCH SPACE: (3,3))

OPTIMIZED NOTE SEGMENTATION AND CLASSIFIER COMBINATION
FOR MOG + BOOTSTRAP TEST (SEARCH SPACE: (7, 7))

OPTIMIZED NOTE SEGMENTATION AND CLASSIFIER COMBINATION
FOR MOG + BOOTSTRAP TEST (SEARCH SPACE: (15, 15))

GA VARIABILITY USING MOG + BOOTSTRAP (SEARCH SPACE: (3, 3)). THE 2 X 3 SOLUTION WAS ACHIEVED 188 TIMES AND THE 1 X 3 SOLUTION WAS OBTAINED TWELVE TIMES OUT OF THE 200 RUNS.

| NO. OF RUNS | OPT_SEG | OPT_COMB | GA TRAINING SET | | TEST SET | |
|---|---|---|---|---|---|---|
| | | | FN | FP | FN | FP |
| 188 | 2 x 3 | $D_3, D_4, D_6$ | 5.67 % | 2.96 % | 4.82 % | 5.22 % |
| 12 | 1 x 3 | $D_1, D_3,$ | 8.67 % | 1.92 % | 5.62 % | 1.21 % | ately validating or authenticating currency.
CURRENCY VALIDATION

BACKGROUND OF THE INVENTION

The present invention relates to a method and system for devising a template for validating currency. The invention also relates to a method and system, in particular a self-service system such as an automated teller machine, for automatically validating or authenticating currency.

Banks and financial institutions have an increasing need to provide their customers with an expanding range of high standard financial self-services. The most popular and well-established service currently available is the Automatic Teller Machine (ATM). At present, ATMs are primarily used to allow customers to access personal financial information and to dispense cash. However, there is an increasing requirement to provide secure deposit transaction capabilities to complement these traditional ATM services.

Although some ATMs that can accept cheque and banknote deposits are available, only a limited number of these allow the validation and confirmation of the authenticity of the enclosed currency or cheques to be completed by the ATM. Instead, more generally, bank personnel have to manually confirm the validity of the deposit before completing the transaction and, in the case of a cash deposit, authorizing the re-circulation of the banknotes. For cash deposits, this is a problem, because it means that there is often a significant delay between receipt of the banknotes at the ATM and re-circulation of these notes.

Automated currency verification and validation systems for incorporation in ATMs have been proposed, and indeed some are currently available. The aim of these is to allow deposited banknotes to be verified and validated within an ATM and then re-circulated as part of the withdrawal service of that same ATM. However, a fundamental danger of automated currency validation is the possibility of utilizing a currency recycling facility within ATMs as a means of circulating counterfeit currency.

At present, in order to validate currency classical pattern recognition techniques are used. For these to be effective, a representative sample of both genuine and counterfeit currency has to be available to devise discriminator templates. All other notes are compared with these discriminator templates. Notes that are identified as genuine are accepted. All other notes, such as counterfeits or defaced genuine notes or unknown notes, are rejected. In current systems, the templates are prepared manually by the observation of collected data and by putting more emphasis on some of the data than others. However, this handcrafted template approach is very time consuming and costly, and prevents rapid reaction to new counterfeits. Manufacture of the templates is done centrally, which requires the movement of data or notes and the use of an expert craftsman to carry out the work. This means that the templates can take several weeks to prepare, which in turn means that there is a delay between issuance of new currency, and the inevitable new counterfeits, and a validation mechanism for banks.

SUMMARY OF THE INVENTION

An object of the invention is to provide method for devising a template for a document such as a cheque or banknote that has to be validated.

Another object of the invention is to provide an improved method for verifying and validating such documents, and in particular banknotes.

According to a first aspect of the present invention, there is a provided a method for creating a template for a document, such as a banknote, that has to be validated, the method comprising using a scanner or imager to capture images of a plurality of reference documents, such as banknotes, and using the captured images to define a reference template. By template it is meant a representation of the reference images, which typically is a numerical or statistical representation of those images.

By using a plurality of scanned images of genuine documents to define a template, there is provided a very simple and effective method for dynamically creating a reference template that can be used in later validation processes. Because the template is built up merely by scanning images of genuine notes, there is no need for expert intervention in the manufacture of the template. This means that reference templates can be generated quickly and cheaply when new currency is introduced.

The imager or scanner may be an optical or thermal or magnetic imager or scanner. As one example, the imager may comprise a plurality of light sensors, preferably each being sensitive to a different color. In this case, the image may be represented by color differences. Here, the template would be a representation of the distribution of optically measured color differences within the inks that cover the document. This is particularly useful for banknotes. In a preferred embodiment, four different sensors are provided and the image is represented by a six dimensional vector, each dimension of the vector being indicative of differences in intensity between signals received at two of the four sensors. The imager or scanner could be included in a self-service terminal so that the template can be determined locally as and when desired. Alternatively, the imager or scanner could be provided in a secure area of a bank for use by bank personnel.

The method may further involve segmenting each image in a like manner into a plurality of segments, and using like segments of the images to determine a reference segment or reference segment parameter for each segment. By using or comparing like segments of each of a plurality of images of genuine documents, it is possible to build up a segmented reference image that can be used in a subsequent validation technique.

Preferably, the step of using the segments of the images involves determining a reference classification parameter for each segment; and defining a threshold for the reference classification parameter. By defining a threshold value for the reference classification parameter or range of such parameters for each segment of the genuine note, it is possible to determine whether other test notes of unknown status are genuine by determining classification parameters for segments of the test note and comparing these with the threshold for the reference classification parameters. An advantage of doing this is that by varying the threshold value for the classification parameter, there is provided a very simple way for changing the acceptable margin of error. In the banking environment, this is useful, because it allows banks flexibility in setting how many counterfeit notes they would be prepared to accept and likewise how many valid notes they would be prepared to reject.

Preferably, the step of classifying comprises using a one-class classifier. The one-class classifier may use a parametric $D^2$ test, as described in the book "Multivariate Statistical Methods" (third edition), by Morrison, McGraw-Hill Publishing Company, New York (1990). Another one-class classifier that could be used is a semi-parametric test based on a mixture of Guassians. This semi-parametric test may employ a bootstrap.

Preferably, the method further involves optimizing the step of segmenting, for example optimizing the number of segments. This may be done using a stochastic algorithm such as a genetic algorithm. The step of optimizing may involve determining a preferred combination of segments that could be used in a validation process, which preferred combination is best for providing an indication of validity.

The method in which the first aspect of the invention is embodied is preferably implemented using software. To this end, according to another aspect of the invention, there is provided a computer program, preferably on a data carrier or computer readable medium, having code or instructions for using images of a plurality of reference documents, such as banknotes, which images are captured using a scanner or imager, and processing the plurality of images to determine a reference template.

Preferably, the computer program has code or instructions for segmenting each image in a like manner into a plurality of segments, and comparing like segments of the plurality of images to determine a reference segment image or reference segment parameter for each segment.

The code or instructions for comparing the segments of the images may be operable to classify each segment to determine a reference classification parameter for each segment, and preferably a threshold for the reference classification parameter. The code or instruction for classifying may implement a one-class classifier, for example a one-class classifier that uses a parametric $D^2$ test or a semi-parametric test based on a mixture of Guassians, preferably employing a bootstrap.

The computer program may comprise code or instructions for optimizing the step of segmenting, preferably by determining a preferred number of segments and/or a preferred combination of segments for use in a validation process. The code or instructions for optimizing the step of segmenting may use a stochastic algorithm.

According to yet another aspect of the present invention, there is provided a system for developing a template for a document that has to be validated, the system comprising means for using images of a plurality of genuine documents such as banknotes; means for segmenting each image in a like manner into a plurality of segments; means for classifying the segments of the images to determine a reference classification parameter for each segment; and means for defining a threshold for the reference classification parameter.

Once the template is dynamically defined using any of the techniques in which the preceding aspects of the invention are embodied, it can be used in a subsequent validation process. To this end, according to still another aspect of the invention, there is provided a method for verifying or validating documents comprising capturing an image of the document; segmenting that captured image into a plurality of different segments; comparing one or more of the segments of the captured image with corresponding segments of a reference image, and determining whether the document is valid or invalid based on the results of the step of comparing.

By comparing one or more of the segments of the captured image with the corresponding segments of the reference image, it is meant comparing the image segments or any data associated with or indicative of those image segments. In particular, the step of comparing the segments of the image with the corresponding segments of the reference image may involve classifying each segment to determine a classification parameter, and comparing that classification parameter with a threshold reference classification parameter for the corresponding segment of the reference image. The step of classifying may use a one-class classifier. The one-class classifier may use a parametric $D^2$ test, or a semi-parametric test based on a mixture of Guassians. The semi-parametric test may employ a bootstrap.

The method may involve comparing a plurality of the captured image segments with a corresponding plurality of the reference segments, thereby to determine the validity of each of these segments. To determine the overall validity of the document, the validity of a plurality of the segments may be combined. This may be done using a unanimous vote, in which all of the segments considered have to be valid in order to give an overall result that the document is valid. Alternatively, a majority vote be used, in which only a majority of the segments considered have to be valid in order to give an overall result that the document is valid.

In order to combine the results of the validation of each segment, a figure of merit may be assigned to each segment, the figure of merit being indicative of whether or not a segment is valid. The figure of merit may be an integer. As a specific example the integer 1 may be used to indicate that a segment is valid and value 0 may be allocated to segments that are invalid. To determine overall validity, the figures of merit for each of the plurality of segments may be multiplied together.

When a document is determined to be valid, the captured image or any data associated with it may be used to up-date the reference image. In this way, the reference image is continuously being improved.

According to yet another aspect of the invention, there is provided a system, preferably a self-service terminal, such as an ATM, for verifying or validating documents, the system comprising means for capturing an image of the document; means for segmenting that captured image into a plurality of different segments; means for comparing one or more of the segments of the captured image with corresponding segments of a reference image, and means for determining whether the document is valid or invalid based on the results of the step of comparing.

The system may comprise means for using the captured image or any data associated with it to up-date the reference image, if it is determined that the captured image is valid.

According to still another aspect of the invention, there is provided a method for creating a template of a document, such as a banknote, comprising capturing an image of the document, classifying the image using a one-class classifier, and using the classification data as a reference or template for use in a subsequent validation process.

According to yet another aspect of the invention, there is provided a method for verifying or validating documents comprising capturing an image of the document, classifying the image using a one-class classifier, comparing the classification data with reference classification data and determining whether the document is valid or invalid based on the results of the step of comparing.

BRIEF DESCRIPTION OF THE DRAWINGS

Various aspects of the invention will now be described by way of example only and with reference to the accompanying drawings, of which:

FIG. 5 is a table showing false negative and false positive rates for two different one-class classifiers;

FIG. 6 is a table showing false negative and false positive rates for a two-class classifier;

FIG. 11 is a table of results on an optimized note segmentation and classifier combination for another one-class classifier;

FIG. 12 is a diagrammatic representation of an optimized note segmentation and classifier combination for the results of FIG. 11 for the search space (3, 3);

DETAILED DESCRIPTION

The present invention provides a system and method for dynamically determining a reference template for a banknote using genuine notes and using that reference template to verify or authenticate banknotes deposited by customers. By providing a mechanism for dynamically generating the reference template, when new currency is issued, a reference template can be readily obtained merely by using examples of genuine notes. This means that banks can be more responsive to changes in currency. This closes a window of opportunity for fraudsters. In addition, if a representative number of counterfeit examples are available, an additional template for these can also be dynamically generated, so that notes deposited by customers can be compared with one or both of the reference template for genuine notes and the counterfeit template.

Figure 1:
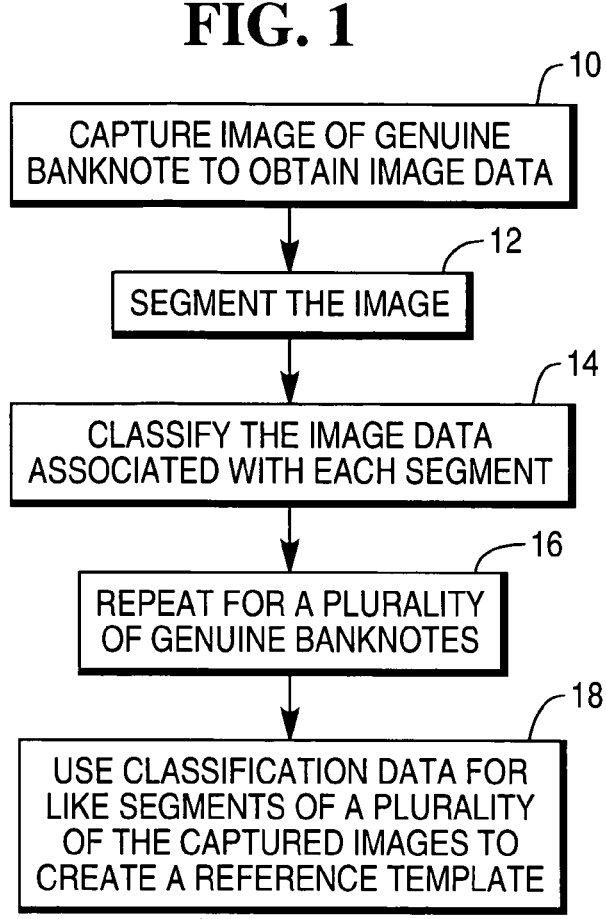
FIG. 1 is a flow diagram of the steps taken to create a template of a banknote, or other image rich document.
Figure 2:
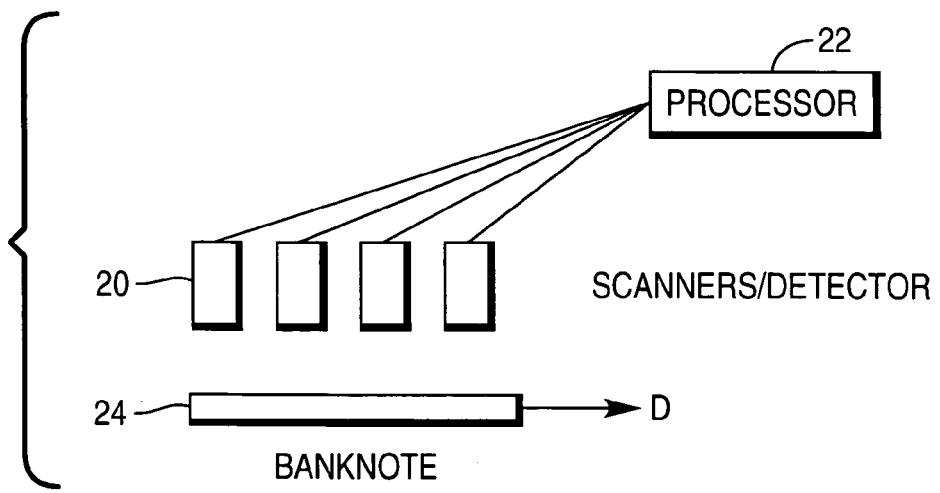
FIG. 2 is a block diagram of a system for creating a template of a banknote.

FIG. 1 shows the steps taken to create a template of a banknote in accordance with the invention. As a first step, to characterize banknotes to build up a suitable template for use in a later validation scheme, images of genuine notes are captured 10. To do this, a plurality of genuine or reference notes 24 is scanned or imaged using a scanner/detector arrangement 20 and the resultant image data is processed using a suitable processor 22, see FIG. 2. The step of imaging can be done in any suitable manner, but preferably by using a set of narrow-band sensors, which provide responses to radiation reflected from across the surface. In a preferred example, four sensors are used. The sensors used are all light emitting diodes (LEDs). Each emits a different type of radiation. Preferably, the sensors comprise a red LED, a green LED, a blue LED and an IR LED. Light from these is directed onto the surface of the banknote and four suitable detectors are provided to detect the reflected signals. In this way, four separate images are captured, one for each of the four LEDs.

Figure 3:
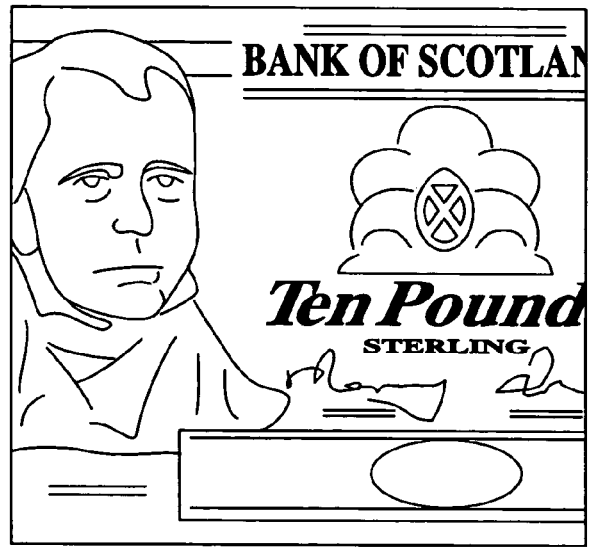
FIG. 3 is a representation of a portion of a banknote.
Figure 4:
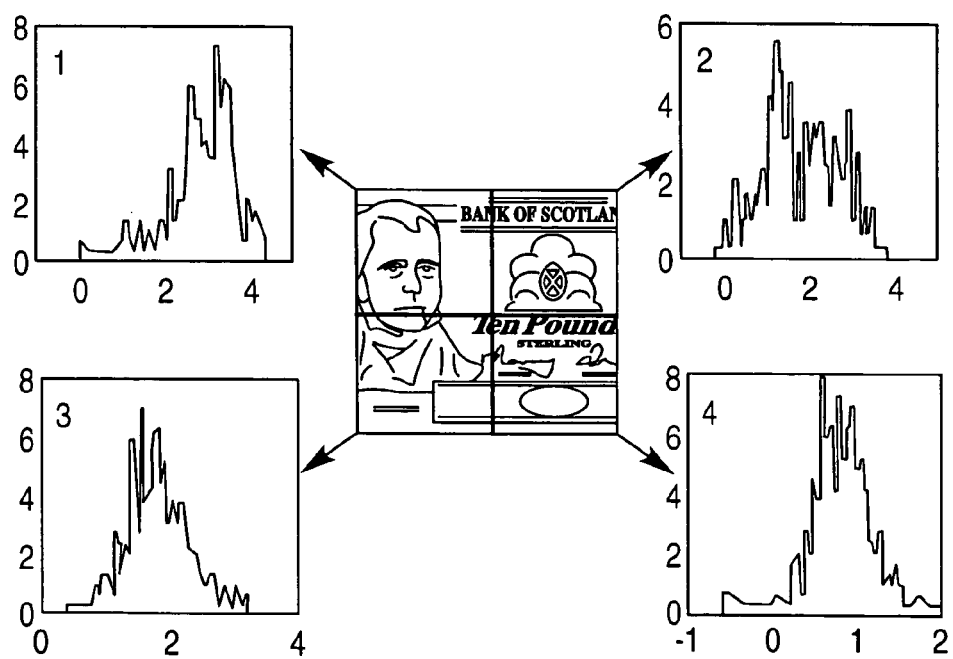
FIG. 4 is a representation of the banknote of FIG. 1 that is segmented into four segments.

Each of the images captured by the various detectors has a plurality of pixels, which represents the intensity of the radiation received by the detectors at a given point. The image data for each banknote or a selected region of each banknote, is segmented into non-overlapping and equal-sized sub-regions, see step 12 of FIG. 1. This is done by over-laying a pre-determined grid on the captured image. Pixels that fall within the same portion of the grid are taken to define a particular segment of the image. As a specific example, FIG. 3 shows a selected region of a Bank of Scotland £10 note. FIG. 4 shows a segmentation of the selected region of the bank note of FIG. 3 into four equal sized square segments. For the purposes of illustration, a one-dimensional distribution for each region is also shown. More generally, each note is segmented into R by C sub-regions, which can be numbered from 1 to L, left-to-right and then top-to-bottom wise, where R and C are respectively the number of segmented rows and columns, and L=RC is the total number of segmented sub-regions.

Every pixel of each of the four images is compared with the corresponding pixel of each of the other images, and the difference in intensity is stored. In particular, the difference in intensities between the red and green data is determined, the difference in intensities between the red and blue data is determined etc. In all a six-dimensional feature set is derived from the responses from the four detectors for every segment of the image, so that every segment is represented by such a six-dimensional feature set.

To classify the document, individual classifiers on the feature sets extracted from each segment or region are devised. Each segment is individually considered in order that it can be classified, see step 14 of FIG. 1. In the present case, a mathematical function termed a one-class classifier is used. This type of classification is useful where information on only one class is available. It defines a boundary around the known class, so that samples that fall outside this boundary are deemed not to belong to the class. In the present example, the information that is available is the pattern and layout of the segments of genuine banknotes. Each of these is classified to define suitable boundaries. The resultant classifications for each segment are then used in order to create a reference template, see step 18 of FIG. 1, which can be used to validate or authenticate other banknotes. As part of the validation process, different segments may be given different levels of significance or weights. This is because certain segments of a banknote may be more difficult for fraudsters to copy and so may be more likely to indicate the presence of a counterfeit. This will be described in more detail later.

One-class classifiers are well known. Examples of these are described in "Support vector domain description" by Tax et al in Pattern Recognition Letters, 20(11-13) 1999 1191-1199; "One-class classification" by Tax, Technische Universiteit Delft Ph.D. Thesis, (2001) and "Support Vector Novelty Detection Applied to Jet Engine Vibration Spectra" by Hayton et al in Advances in Neural Information processing Systems 13, MIT Press, 946-952, (2001). One example of a preferred classifier is based on a parametric $D^2$ test, as described in the book "Multivariate Statistical Methods" (third edition), by Morrison, McGraw-Hill Publishing Company, New York (1990). Another example of a suitable one-class classifier uses a semi-parametric test based on a mixture of Guassians, which semi-parametric test employs a bootstrap as described in "An Introduction to the Bootstrap" by Efron et al Chapman Hall/CRC Press LLC, Boca Raton, Fla. (1998). Each of these will be described in more detail.

A specific example of a classifier that can be used to devise a template and subsequently be used to validate currency will now be described. Consider N independent and identically distributed p-dimensional vector samples, in this case, the feature set for each segment of each banknote can be represented by $x_1, \ldots, x_N \in C$ with an underlying density function with parameters $\theta$ given as $p(x|\theta)$. The following hypothesis test is given for a new point $x_{N+1}$ such that $H_0: x_{N+1} \in C$ vs $H_1: x_{N+1} \notin C$, where C denotes the region where the null hypothesis is true and is defined by $p(x|\theta)$ and the significance level of the test. Assuming that the distribution under the alternate hypothesis is uniform, then the standard log-likelihood ratio for the null and alternate hypothesis can be employed as a test statistic for the null-hypothesis. This test can be expressed as follows:

$$\lambda = \frac{\sup_{\theta \in \Theta} L_0(\theta)}{\sup_{\theta \in \Theta} L_1(\theta)} = \frac{\sup_{\theta} \prod_{n=1}^{N+1} p(x_n|\theta)}{\sup_{\theta} \prod_{n=1}^{N} p(x_n|\theta)}$$

This can be used as a statistic for the validation of a newly presented note. More specifically, a reference set of notes N is scanned and the six dimensional feature vectors are analyzed to determine a threshold value for $\lambda$ for each segment of the note. The threshold value defines a boundary between what is acceptable and what is unacceptable. In practice, this threshold value defines a lower limit. If the value of the test statistic $\lambda$ for a segment of test sample were below this, the test segment would be rejected. Likewise, if the value of the test statistic $\lambda$ for a segment of test sample were above this, the segment would be accepted. Hence, in order to validate a test segment, it is scanned, segmented in a like manner to the segmentation used to define the reference template and a value for $\lambda$ is determined for each segment. These values are compared with the reference threshold values for the corresponding segments to determine the validity of each of the segments.

One specific approach is to assume that the feature vectors for the banknote have a multi-variate Gaussian distribution. A test can then be applied to assess whether each point in a sample shares a common mean. Examples of this type of test are described in more detail in the book "Multivariate Statistical Methods" (third edition), by Morrison, McGraw-Hill Publishing Company, New York (1990). As a specific example of a suitable test, consider N independent and identically distributed p-dimensional vector samples $x_1, \ldots, x_N$ from a multi-variate normal distribution with mean $\mu$ and covariance C, whose sample estimates are $\hat{\mu}_N$ and $\hat{C}_N$. From this sample consider a random selection denoted as $x_0$. For this selection the associated squares Mahalanobis distance is:

$$D^2 = (x_0 - \hat{\mu}_N)^T \hat{C}_N^{-1} (x_0 - \hat{\mu}_N)$$

This can be shown to be distributed as a central F-distribution with p and N-p-1 degrees of freedom by:

$$F = \frac{(N-p-1)ND^2}{p(N-1)^2 - NpD^2}$$

Then, the null-hypothesis of a common population mean vector for $x_0$ and the remaining $x_i$ will be rejected if:

$$F > F_{\alpha, p, N-p-1}$$

where $\alpha$ is a pre-set significance level for the test and $F_{\alpha, p, N-p-1}$ is the upper $\alpha 100\%$ point of the F-distribution with (p, N-p-1) degrees of freedom, so that by using this threshold a times 100% genuine samples will be rejected. The incremental estimates of the mean and covariance $\hat{\mu}_N$ and $\hat{C}_N$ respectively are as follows:

$$\hat{\mu}_{N+1} = \frac{1}{N+1}\{N\hat{\mu}_N + x_{N+1}\}$$

$$\hat{C}_{N+1} = \frac{N}{N+1}\hat{C}_N + \frac{N}{(N+1)^2}(x_{N+1} - \hat{\mu}_N)(x_{N+1} - \hat{\mu}_N)^T$$

By using the above expressions for the estimates of the mean and covariance and the matrix inversion lemma, the equation $D^2$ for an N-sample reference set and an (N+1)th test point becomes:

$$D^2 = \delta_{N+1}^T \hat{C}_{N+1}^{-1} \delta_{N+1}$$

where $$\delta_{N+1} = \frac{N}{N+1}(x_{N+1} - \hat{\mu}_N) \text{ and}$$

$$\hat{C}_{N+1}^{-1} = \frac{N+1}{N}\hat{C}_N^{-1} - \frac{\hat{C}_N^{-1} \delta_{N+1} \delta_{N+1}^T \hat{C}_N^{-1}}{N + \frac{N}{N+1}\delta_{N+1}^T \hat{C}_N^{-1} \delta_{N+1}}$$

Hence, $D^2 = \frac{N+1}{N} D_{N+1,N}^2 \left\{1 - \frac{D_{N+1,N}^2}{D_{N+1,N}^2 + N + 1}\right\}$ where $D_{N+1,N}^2$ is $\delta_{N+1}^T \hat{C}_N^{-1} \delta_{N+1}$. Hence, a new point $x_{N+1}$ can be tested against an estimated and assumed normal distribution for a common estimated mean and covariance. It should be noted that employing the log-likelihood ratio for the one-class hypothesis test, the test statistic can be derived directly.

In practice, when the parametric $D^2$ test is used, N reference notes are scanned and segmented. Each of these segments is classified by determining a value for $D^2$ for every one of the reference notes and using this to set a reference threshold value for each segment. This threshold value is used to determine whether corresponding segments of subsequent test notes are valid.

The above analysis is based on the assumption that the feature vectors are distributed as multivariate Gaussian. Often this does not hold in practice, although may be an appropriate pragmatic choice in many applications. However, this assumption can be relaxed and arbitrary densities can be considered. The density under a mixture model has the following standard form:

$$p(x) = \sum_{j=1}^{M} p(x|j) P(j)$$

where $P(j)$, $j=1, \ldots, M$ are the mixing parameters. These are chosen to satisfy the constraints $$\sum_{j=1}^{M} P(j) = 1$$

and $P(j) \geq 0$. The component density functions $p(x|j)$ are normalized so that $\int p(x|j)dx=1$. As a specific example, Gaussian mixture models are used, so that:

$$p(x|j) = \frac{1}{(2\pi)^{p/2}|\Sigma_j|^{1/2}} \exp\left\{-\frac{1}{2}(x-\mu_j)^T \sum_j^{-1} (x-\mu_j)\right\}$$

The required parameters can be estimated using the Expectation Maximization (EM) algorithm. A technique for doing this is described in "Neural Networks for Pattern Recognition" by Bishop, Oxford University Press, New York (1995). This density can then be employed in computing the log-likelihood ratio. Unlike the case for the multivariate Gaussian distribution there is no analytic distribution for the test statistic $\lambda$ under the null-hypothesis. To obtain the otherwise non-analytic null distribution under the mixture of Gaussian density, bootstrap methods can be employed. By doing this, the various critical values of $\lambda_{crit}$ can be established from the empirical distribution obtained. It can be shown that in the limit as N tends to infinity, the likelihood ratio can be estimated by the following:

$$\lambda = \frac{\sup_{\theta \in \Theta} L_0(\theta)}{\sup_{\theta \in \Theta} L_1(\theta)} \rightarrow p(x_{N+1}; \hat{\theta}_N)$$

where $p(x_{N+1}; \hat{\theta}_N)$ denotes the probability density of $x_{N+1}$ under the model estimated by the original N samples. After generating B bootstrap samples from the reference data set and using each of these to estimate the parameters of the mixture distribution $\hat{\theta}^i_N$, B bootstrap replicates of the test statistic $\lambda^i_{crit}$ (i=1, ... B) can be obtained by randomly selecting an (N+1)th sample and computing $p(x_{N+1}; \hat{\theta}_N^i) \approx \lambda_{crit}^i$. By ordering $\lambda^i_{crit}$ in ascending order, the critical value $\alpha$ can be defined to reject the null-hypothesis at the desired threshold or significance level if $\lambda$ is less than or equal to $\lambda_\alpha$, where $\lambda_\alpha$ is the jth smallest value of $\lambda^i_{crit}$ and $\alpha=j/(B+1)$. By scanning N different notes; segmenting the images and calculating $\lambda$ for each segment to determine a reference threshold, it is possible to validate subsequent notes by determining whether one or more of the test segments is within the tolerance level of what is acceptable.

Any of the above classifiers could be used to validate banknotes or other image rich documents. In any case, when the required one-class classifier is selected, it is trained on each segment or sub-region of the note, so that boundary conditions for each segment can be defined, that is limits that define what is regarded as being an acceptable or unacceptable variation from the reference segment. The classifier for the ith sub-region is denoted as $D_i$, where i=1, ..., L. The classifier is trained using feature matrices for the reference image, where these reference feature matrices can be represented by $X_k=(x_i^k)$, where k=1, ... N; i=1, ... L, and $x_i^k=[x_1^k, x_2^k, ... x_p^k]^T$ is a p-dimensional feature vector of the kth sample in the ith sub-region. Once trained on the reference notes, the classifiers for the various segments can be used to validate other banknotes. In particular, the classifiers $D_i$ can be used to determine whether or not each segment of the note is within the defined classification boundary and so acceptable or outside the defined boundary and so rejected.

When a test sample t is presented, its feature matrix $T=t_i$, where i=1, ..., L, is extracted. Then, using the ith one-class classifier $D_i$ trained by $\{x_i^1, x_i^2, ... x_i^N\}$, $t_i$ can be tested using the same rule to give the decision $y_i(t)$ whether it is rejected or accepted. As a specific example $y_i(t)$ may be defined as 0 if $t_i$ is rejected by Di and 1 if $t_i$ is accepted by $D_i$. There are various ways in which the final decision $Y(t)$ for the test sample t can be calculated. As one example, the product $Y(t)$ of individual decisions $y_i(t)$ can be determined. The test note t is rejected as a forgery if $Y(t)=0$, or accepted as a genuine note if $Y(t)=1$. This product combination decision rule described above can be seen to be equivalent to a unanimous vote. This means that a note is only accepted if all selected classifiers indicate that it is genuine, otherwise it would be rejected. Unanimous voting is an extreme situation of commonly used majority voting when requiring all the voters to agree with consensus. Unanimous voting is preferred technique here, because of the higher cost assigned to incorrectly accepting forgeries. Nevertheless, in some circumstances majority voting may be useful.

To illustrate the differences between unanimous and majority voting techniques, consider the following definitions for the final decision $Y_{MV}(t)$ made by employing a majority vote and the final decision $Y_{UV}(t)$ by a unanimous vote for a note under test t:

$$Y_{MV}(t) = \text{INT}\left[\frac{\sum_{i=1}^{L} y_i(t)}{\text{INT}(L/2) + 1}\right]$$

$$Y_{UV}(t) = \Pi_{i=1}^{L} y_i(t)$$

Here, $\text{INT}(\cdot)$ means rounding down the element to its nearest integer, and both $Y_{MV}(t)$ and $Y_{UV}(t)$ can only have the value of either 1 or 0. The expression for $Y_{UV}(t)$ can be re-written as:

$$Y_{UV}(t) = \text{INT}\left[\frac{\sum_{i=1}^{L} y_i(t)}{L}\right]$$

Given $N_f$ counterfeit samples $\{t_f^{k1}\}$, where $k_1=1, ... N_f$, and $N_G$ genuine samples to test $\{t_g^{k2}\}$ where $k_2=1, ..., Ng$, the False Negative (FN: false acceptance rate of forgeries) and False Positive (FP: false rejection rate of genuine notes) can be calculated by $$FN = \frac{\sum_{k_1=1}^{N_f} Y(t_f^{k1})}{N_f}$$

$$FP = \frac{N_g - \sum_{k_2=1}^{N_g} Y(t_g^{k2})}{N_g}$$

where $Y(\ )$ can be either $Y_{UV}(t)$ or $Y_{MV}(t)$. As can be shown from the above equations, the unanimous vote approach achieves lower FN than the majority vote. However, at the same time the unanimous vote also produces higher FP than majority voting. This is because majority voting looks at the average information rather than the individual characteristics. Therefore, for testing genuine notes, as their features are relatively uniform within the reference samples in all sub-regions, majority voting can potentially achieve better results. In contrast, for identifying counterfeits, a unanimous vote may be more appropriate. This is because very high quality counterfeits have similar feature distributions as genuine notes in a number of sub-regions and differences exist in a few specific sub-regions where the genuine features might be too complex to be completely duplicated by the counterfeiting process. By taking account of the average information, majority voting may give the final decision according to most of the sub-regions that might give an incorrect judgment for counterfeits. Hence, for identifying counterfeits unanimous voting may be preferred.

Whilst the unanimous vote based technique does not have the problem of giving wrong decisions towards counterfeits, it does however suffer from falsely rejecting, for example, poor quality genuine notes due to the worn nature of the note in some sub-regions. Hence, as with all statistical tests, there is a trade-off between FN and FP. In this particular application, FN is more important than FP. The proposed log-likelihood ratio tests described previously allow the expected FP level of individual classifiers to be specified by setting the significance levels of each test. Therefore, the extreme unanimous vote is preferred to balance the overall FN and FP performance. As an example, by segmenting a whole note into 3 by 3 equal sized regions and combining all 9 classifiers, in testing 1000 genuine notes and 1000 forgeries, majority voting achieved FN=23.9% and FP=0.50%; while unanimous voting achieved values of FN=2.30% and FP=8.20%.

When applying the unanimous vote combination rule, selecting appropriate classifiers to be combined is important. Not all the classifiers built on sub-regions have to be combined and indeed doing so may reduce the robustness of the whole classification system as mentioned above. This is because some of the segments of the note may be more difficult to copy than others and so may be more likely to provide evidence of a counterfeit. Hence, to make the classification process more accurate, there is provided an optimization technique for identifying the ideal number of segments and/or the combination of segments that is most likely to indicate that a segment is not valid and so potential counterfeit activity.

Considering an $R_{max} \times C_{max}$ searching space where $R_{max}$ and $C_{max}$ are preset maximum numbers of rows and columns of the segmentation, the total number of possible ways to segment and combine the individual regions would be:

$$P = \sum_{i=1}^{R_{max}} \sum_{j=1}^{C_{max}} \sum_{k=1}^{ij} \binom{k}{ij}$$

where $$\binom{k}{ij}$$

is the number of combinations of ij regions taken k at a time. If $R_{max}=15$ and $C_{max}=15$, $P=5.3923 \times 10^{67}$. This value exponentially increases following the changes of bigger $R_{max}$ and $C_{max}$. Therefore, it is impossible to carry out exhaustive searching experiments. To achieve a useful result an optimized note segmentation and classifier combination strategy is proposed to gain the best trade-off between FN and FP performance can be achieved. In this, an optimal number of segments and an optimized classifier combination set are identified by a stochastic genetic algorithm (GA). This is useful because, as will be appreciated, different currencies have different feature distributions, so it is impossible to define a uniform segmentation and combination that is suitable for all possible currencies.

To optimize the note segmentations as well as the classifier combination at the same time, a stochastic optimization algorithm is used, in particular a genetic algorithm. This has one chromosome c, which is composed of three gene groups $c_r$, $c_c$ and $c_d$, where $c_r=[r_1, r_2, \ldots, r_{n1}]$, $c_c=[c_1, c_2, \ldots, c_{n2}]$ and $c_d=[d_1, d_2, \ldots, d_{n3}]$ are all binary strings. The first two gene groups $c_r$ and $c_c$ respectively represent the number of rows and columns for a note segmentation. Their relationships with R and C are given by: R=BinToDec ($c_r$) and C=BinToDec ($c_c$), where "BinToDec" means transforming a number from a binary expression into decimal expression. Given the number of maximum rows $R_{max}$ and maximum columns $C_{max}$ which define the size of the intended segmentation search space, $c_r$'s length $n_1$ equals the length of the binary string expression of $R_{max}$; and $c_c$'s length $n_2$ equals the length of the binary string expression of $C_{max}$. The third gene group $c_d$ represents the combination of classifiers. Its elements $d_i$ and length $n_3$ are defined as $d_i=0$ if $D_i \notin S$ and $d_i=1$ if $D_i \notin S$ where i=1, 2, \ldots, $n_3$; $n_3=R_{max}C_{max}$ and S is the optimized classifier combination set. For example, given $R_{max}=3$ and $C_{max}=3$, then $n_1$, $n_2$ and $n_3$ would respectively equal to 2, 2 and 9, and a chromosome $$c=[c_r \vdots c_c \vdots c_d]=[11 \vdots 10 \vdots 110101000]$$

means segmenting a note into 3×2 (i.e. R=3, C=2) and combining the classifiers $D_1$, $D_2$, $D_4$ and $D_6$ respectively built on the $1^{st}$, $2^{nd}$, $4^{th}$ and $6^{th}$ sub-regions.

The GA for optimizing the system can be summarized as follows: (1) Initialize a random population of n chromosomes; (2) Perform crossover and mutation operations to create another n offspring; (3) carry out the validation operation, and calculate a fitness for each chromosome; (4) Select n chromosomes with the best fitness among all the parents and offspring as the next generation, and (5) if convergent or over the preset maximum iteration steps then stop, otherwise go to step (2). To implement this overall strategy, the GA has three gene operations for the chromosome. The first operation is gene crossover. Considering the characteristics of the chromosomes, two crossover points in one chromosome are set to complete the crossover operation with other chromosomes. One is the point between $c_r$ and $c_c$; and the other is the point in the middle of $C_d$. For example, if there are two chromosomes $c_1$ and $c_2$ represented as follows:

$$c_1=[c_r^1 \vdots c_c^1 \vdots d_1^1 d_2^1 \ldots d_{n_3}^1]$$

$$c_2=[c_r^2 \vdots c_c^2 \vdots d_1^2 d_2^2 \ldots d_{n_3}^2]$$

after crossover, two new chromosomes $C_1^{new}$ and $C_2^{new}$ are produced, where $$c_1^{new}=[c_r^1 \vdots c_c^2 \vdots d_1^1 \ldots d_{INT(n_3/2)}^1 \vdots d_{INT(n_3/2)+1}^2 \ldots d_{n_3}^2]$$

$$c_2^{new}=[c_r^2 \vdots c_c^1 \vdots d_1^2 \ldots d_{INT(n_3/2)}^2 \vdots d_{INT(n_3/2)+1}^1 \ldots d_{n_3}^1]$$

The second GA operation is gene mutation. For this, a standard gene mutation operation is used, i.e. every time randomly selecting a gene (bit) to mutate from 1 to 0 or from 0 to 1. The third GA operation is validation. Because once the $c_r$ and $c_c$ have changed, only the first RC genes in $c_d$ are effective, it is necessary to clean up the ineffective genes in order to avoid them affecting other chromosomes in further operations. Therefore the validation operation is designed to set all the $n_3$-RC ineffective genes in $C_d$ to be zeros.

Once the validation operation is carried out, a fitness function is calculated by balancing the performance of FN and FP in the validation set with the GA. Given $N_1$ genuine samples $G=\{g_{k1}\}$, where $k_1=1, \ldots N_1$ and $N_2$ counterfeit samples $F=\{f_{k2}\}$, where $k_2=1, \ldots N_2$ where both $g_{k1}$ and $f_{k2}$ are p-dimensional column vectors, then the decisions $y_i(g_{k1})$ and $y_i(f_{k2})$ of the ith classifier Di towards validation samples $g_{k1}$ and $f_{k2}$ can be calculated. These are used to determine a fitness function, which is defined as:

$$f = \left(\frac{1}{N_1}\sum_{k_1=1}^{N_1}\prod_{\{i:D_i\in S\}}y_i(g_{k_1})\right)^2 + \left(\frac{1}{N_2}\left(N_2-\sum_{k_2=1}^{N_2}\prod_{\{i:D_i\in S\}}y_i(f_{k_2})\right)\right)^2$$

where the first term indicates the True Negative (TN:=1−FP) performance and the second term indicates the True Positive (TP:=1−FN) performance. A chromosome that has a larger value of fitness function will have better performance when applying the segmentation and combination that this chromosome represents.

An alternative approach to evaluate the fitness of chromosomes is to use Receiver Operating Characteristics (ROC). This is described in the paper "Genetic programming for combining classifiers" by Langdon et al, Proceedings of the Genetic and Evolutionary Computation Conference (GECCO'2001), San Francisco, USA, Morgan Kaufmann (2001). However, this requires running tests for each individual sub-region by setting different significance levels. This would lead to higher computation costs.

For the procedure of selecting the segmentation and combination of regions described above, some validation samples in the opposite class (counterfeits) are needed to evaluate the performance of the selected segmentation and combination. However, compared with the amount of counterfeits that would be required to build a two-class classifier, small amounts of counterfeit validation samples suffice for this validation purpose.

In order to compare the effectiveness of the one-class classifiers proposed, various tests have been done on both whole notes and segmented notes. Using 3324 genuine notes as a reference set, based on a single feature vector defining the whole note, the $D^2$ and Mixture of Gaussians (MoG)+Bootstrap tests were employed on 798 counterfeit notes by setting different critical values, that is test significance levels, $\alpha=0.01$, $\alpha=0.05$ and $\alpha=0.10$ to specify the expected FP rate for each test. To obtain the FP rate for genuine notes 10-fold cross-validation was employed. Test results for both tests are listed in FIG. 8. It can be seen that the semi-parametric test for all significance levels provides significantly lower levels of false negatives (counterfeits accepted as genuine) than that obtained by the $D^2$ tests.

For comparison simple binary classifiers or two-class classifiers have also been tested, specifically estimating the class conditional densities based on both a Gaussian and Mixture of Gaussian models. In this experiment, 3324 genuine and 798 counterfeit were used to train the two-class discriminators. Test results are shown in FIG. 4, where 10-fold cross-validation is used for both classes to calculate the values of FN and FP. Employing simple binary classifiers can provide an improvement of around 4% in FN rates over the $D^2$ test, whilst the difference in performance for the MoG+Bootstrap tests is less pronounced. However, employing the one-class classifiers it is possible to reduce the costly FN rate by increasing the significance level of the test and so increase the number of genuine notes rejected (FP). Clearly in cases where large numbers of examples of counterfeits are available then employing binary classifiers will be advantageous, however one-class classifiers are most useful where the numbers of examples from both classes is highly imbalanced such that the distribution of only one class can be reliably estimated.

The results set out in FIGS. 5 and 6 are based on an analysis of the entire note. To test the effect of segmenting the note various segmentations have been tried. In one example $R_{max}$ and $C_{max}$ were set to be (3, 3), (7, 7) and (15, 15). Of course, it will be appreciated that $R_{max}$ and $C_{max}$ do not have to be identical they can be any positive integer greater than zero. Using these values optimized note segmentation and classifier combinations were determined, using individual $D^2$ tests at 1% significance levels. In the experiments the GA used 50 chromosomes in each population. A sample of 2500 genuine notes was used as the reference set for the $D^2$ test. The GA was trained using 10-fold cross-validation on the 2500 genuine samples as well as 300 counterfeit examples. Finally, tests were performed on an independent test set of 824 genuine notes and 498 counterfeits. The reported test results, shown in FIG. 7, are the best selected from 200 repeated runs of the GA.

Figures 7, 8:
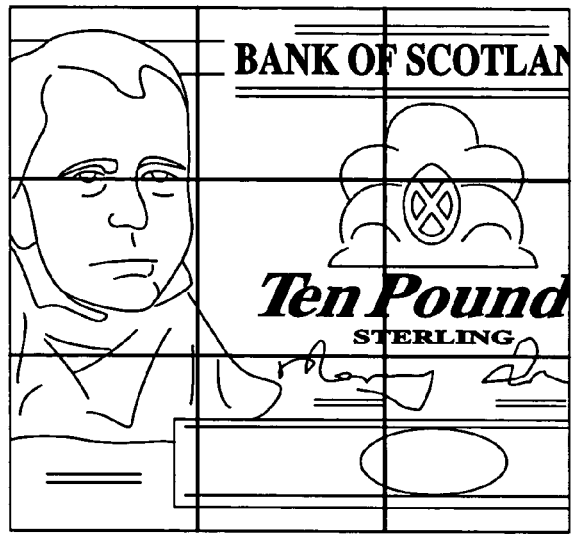
FIG. 7 is a table showing results of an optimized note segmentation and classifier combination.
FIG. 8 is a diagrammatic representation of an optimized note segmentation and classifier combination for the results of FIG. 7 for the search space (3, 3)
Figure 9:
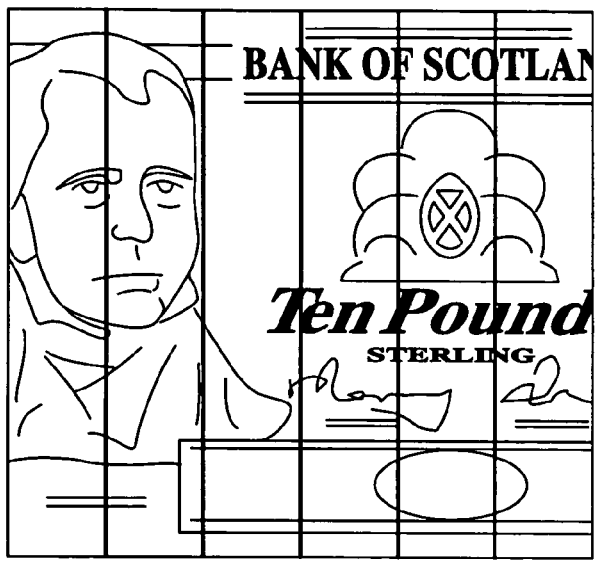
FIG. 9 is a diagrammatic representation of an optimized note segmentation and classifier combination for the results of FIG. 7 for the search space (7, 7)
Figure 10:
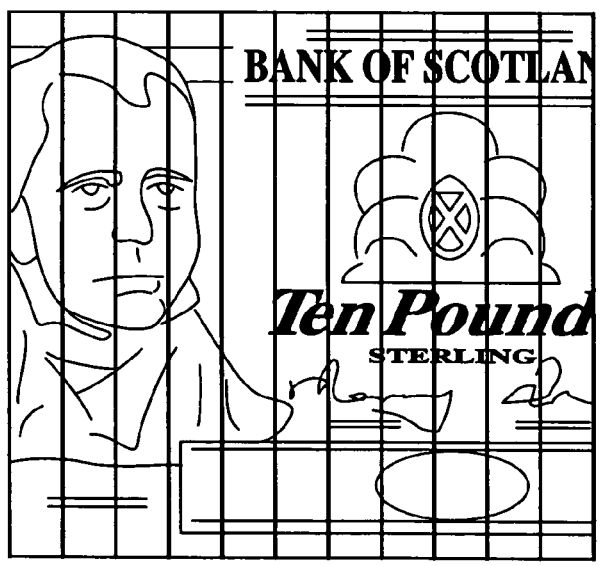
FIG. 10 is a diagrammatic representation of an optimized note segmentation and classifier combination for the results of FIG. 7 for the search space (15, 15)

The optimized note segmentation and classifier combination strategies obtained by running the GA using the $D^2$ test are shown in FIGS. 8 to 10. In comparison to the best results obtained by considering the note as a whole the segmentation and combination strategy has reduced the number or counterfeits wrongly accepted (FN) from 5.76% to 2.41% whilst also significantly reducing the number of genuine notes being erroneously rejected (FP) from 10.1% to 3.03%. Regions of both high contrast with little detail and regions with high levels of detail are combined. Intuitively it would seem likely that the high contrast regions help to reduce the number of genuine notes rejected whilst the highly detailed regions assist in reducing the number of counterfeits wrongly accepted—as these are the regions which are typically more difficult to copy successfully.

Figure 13:
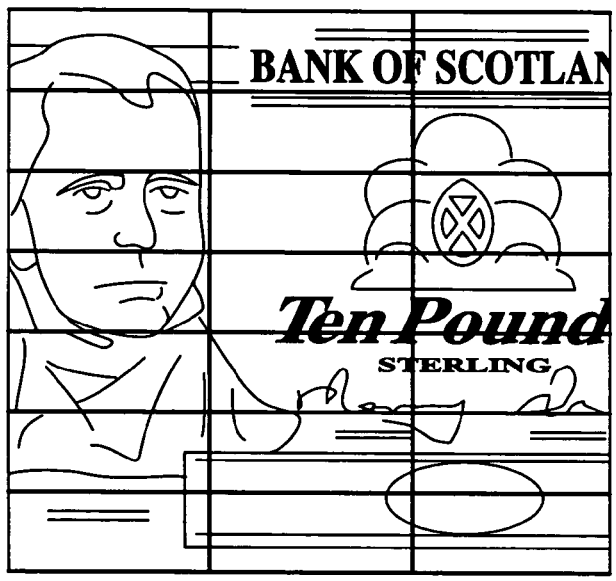
FIG. 13 is a diagrammatic representation of an optimized note segmentation and classifier combination for the results of FIG. 11 for the search space (7, 7)
Figure 14:
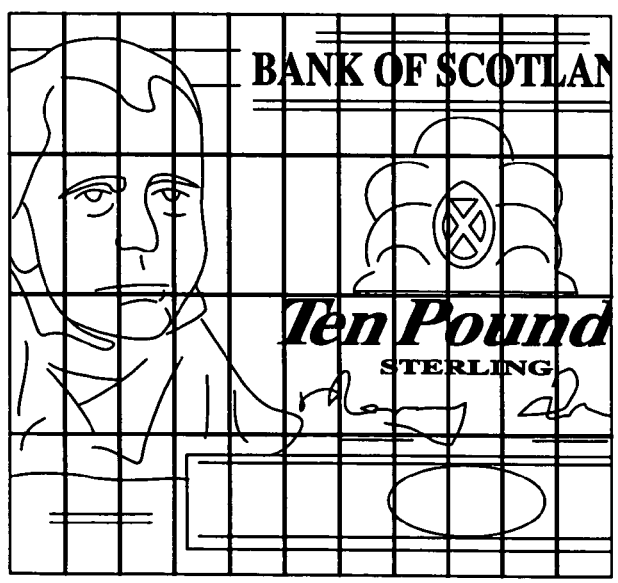
FIG. 14 is a diagrammatic representation of an optimized note segmentation and classifier combination for the results of FIG. 11 for the search space (15, 15)

The test described above with reference to FIGS. 8 to 10 was repeated using the mixture of Gaussian and bootstrap test. Test results (the best selected from 200 repeated runs) are shown in FIG. 11. The optimized note segmentation and classifier combination strategies obtained by running the GA for the mixture of Gaussian and bootstrap test are shown in FIGS. 12 to 14. In this case, when segmenting the note into 4×11 regions, the best performance for the training samples is achieved, whilst the best performance for the independent test set is achieved by segmenting the note into 7×3 regions. This indicates that a more complex segmentation will not necessarily achieve better performance on an independent test set and so a level of 'overfitting' can be observed. In comparison to the best $D^2$ test results obtained, the best MoG+Bootstrap provides a lower FP value, i.e. number of genuine notes rejected, with a marginal increase in the number of FN's. The decrease in FP value is due to the reduced number of regions being tested (two) and so only two tests at the 1% significance level are being performed. In contrast three regions are combined in the $D^2$ test and so the expected FP rate is approximately 3× the individual significance levels. Considering the segmentations and combinations again similar regions of low detail and high detail content have been selected as in the previous case.

Figures 15, 16:
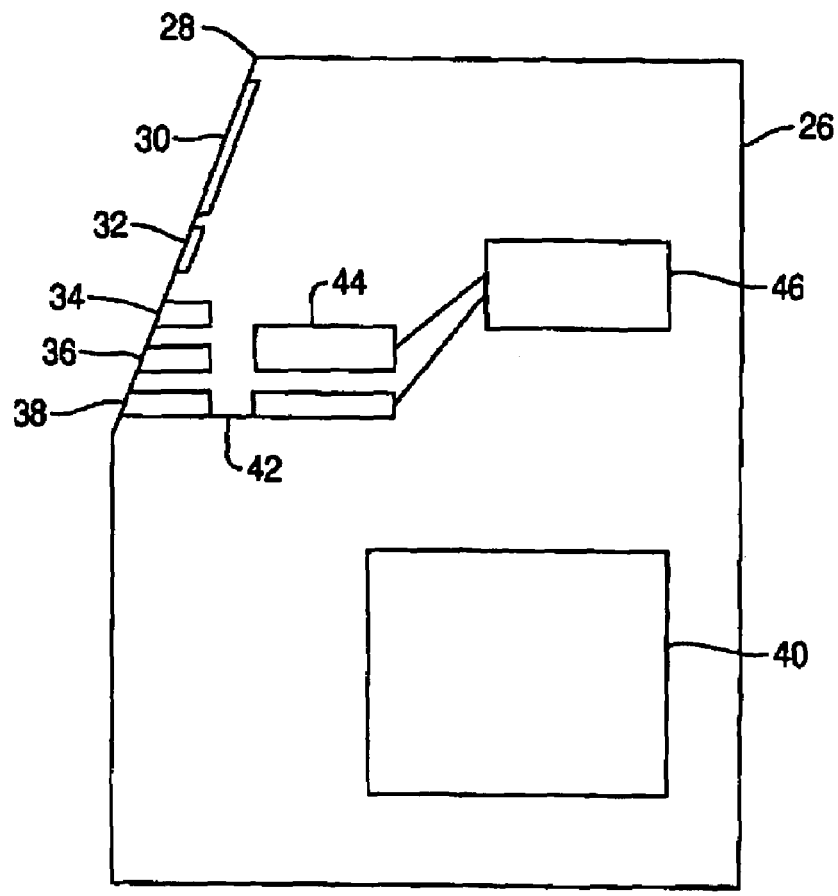
FIG. 15 shows data indicating the variability of a genetic algorithm that is used in a process for optimizing the segmentation and classifier combination.
FIG. 16 is a block diagram of an ATM that is adapted to create a template of a banknote and/or automatically validate currency deposited therein.

Because the GA is a stochastic optimization algorithm, it yields different results in different randomly initialized runs. The GA can be run $N_r$ times and the note segmentation and classifier combination strategy that achieves the best performance can be selected. To investigate the level of solution variability, the GA using mixture of Gaussian and bootstrap was repeatedly run $N_r=200$ times. For the search space (3, 3), only two different results (segmentation and combination strategies) were obtained during 200 randomly initialized runs. These are shown in FIG. 15. For the search space (7, 7) thirty-four different segmentation and combination strategies were obtained from the 200 runs. Among them, the best strategy was a 7×3 segmentation of the note and then combining classifiers $D_{12}$ and $D_{13}$. This achieved a training performance: FN=3.67%, FP=1.88% and a testing performance: FN=2.61%, FP=1.46%. The inter-quartile range (IQR) of values of the training FN, FP and testing FN, FP for those 34 strategies over all runs are respectively: 1.67%, 1.04% and 1.61%, 3.03%. IQR computes the difference between the $75^{th}$ and the $25^{th}$ percentiles of the sample. It is a robust estimate of the spread of the data, since changes in the upper and lower 25% of the data do not affect it. On observation the distribution of FN and FP is not normal, IQR is more representative than the standard deviation as an estimate of the spread of the body of the data. For the search space (15, 15), one hundred and twenty-eight different strategies were obtained through the 200 runs. Among them, the best strategy is a 4×11 segmentation followed by the combination of classifiers $D_{18}$, $D_{22}$ and D24, which achieves training performance: FN–0.67%, FP=2.64% and testing performance: FN=2.81%, FP=2.79%. The IQR of training FN, FP and testing FN, FP of those 128 strategies over all runs are respectively: 3.50%, 1.10% and 1.61%, 1.70%.

In practice, the methods described above for defining a template for validating a bank note and using that template to validate test notes may be implemented within a self-service environment, such as an ATM. In this way, the ATM can be trained in a simple and effective manner to create a reference template and use that template to validate deposits in a secure manner. This can be done without the need for human intervention, so that the entire process is automatic.

FIG. 16 shows an example of an automated teller machine that is configured to implement these techniques. This includes a housing 26 that has a front fascia 28 that has a screen 30 and keyboard 32. Defined in the fascia are three slots, a first one 34 of these being for receiving a user's bank card, the next being provided for dispensing cash through 36 and the third one 38 being for depositing cash into a secure store 40 in the housing 26. One or more carrier mechanisms (not shown) is provided for moving cash from the secure store to the dispensing slot, so that it can be dispensed therefrom, and for moving cash received through the deposit slot to the store. On a path 42 between the deposit slot 38 and the cash store 40 is an imager or scanner 44 for imaging deposited banknotes. In a preferred example, this is the four-sensor imager 44 previously described. The carrier mechanism is operable to carry a banknote received from the deposit slot 38 to the imager 44. Once appropriately positioned relative to the imager 44 one or more suitable images can be captured.

Connected to the imager 44 is a central processing unit 46 that includes software for analyzing the captured images. This software has code or instructions for defining a template based on a plurality of reference images captured from deposited reference notes, in accordance with the techniques described previously. Additionally, the software has code or instructions for validating currency deposited into the ATM, after the initial template is built up, and using an image captured by the imager 44. Again, this validation is done in accordance with the techniques previously described. In the event that currency deposited is deemed to be valid, it is carried into the secure store 40, from where it can be dispensed. In addition, the customer's personal account is updated to show the deposited amount. In the event that currency deposited is deemed by the validation software to be invalid, it is returned to the customer either through the deposit slot 38 or the dispensing slot 36.

Whilst the ATM of FIG. 16 is described as having software for defining a template as well as for validating currency deposited, this is not essential. Instead, the template may be devised at a remote scanning/imaging/processing system, using the method previously described, and the classification threshold parameters may be provided to the terminal. For example, the classification threshold parameters may be downloaded to individual terminals. Alternatively, where a plurality of ATMs are provided in a distributed network, the template information may be stored at a remote location and shared between the remote terminals.

The present invention provides a solution to the long-standing problem of how to validate currency in a self-service terminal. The preferred method is based on the segmentation of the whole note into different sub-regions followed by the combination of individual classifiers built on those regions. It has the advantage of being applicable to notes of any currency when there is insufficient numbers of counterfeit examples to build a robust binary classifier. In a preferred embodiment, one-class classifiers are employed and a genetic algorithm is used in selecting the optimized note segmentation and classifier combinations. The method in which the invention is embodied dramatically improves discrimination performance based on false negative and false positive levels.

A skilled person will appreciate that variations of the disclosed arrangements are possible without departing from the invention. For example, whilst the validation techniques are described primarily with reference to currency validation, they could equally be applied to other documents that are rich in image data, such as event tickets or passports. In addition, although the classifiers described herein are based on a parametric $D^2$ approach or a semi-parametric test, it will be appreciated that any suitable one-class classifier could be used. One-class classification techniques that could be used include the Support Vector Data Domain Description (SVDD), also known as 'support estimation', described in "Support vector domain description" by Tax, Pattern Recognition Letters 20(11-13) 1999 1191-1199, and Extreme Value Theory (EVT), which is described in the article "Novelty detection using extreme value statistics", by Roberts, IEE Proceedings on Vision, Image & Signal Processing, 146(3) (1999) 124-129. In SVDD the support of the data distribution is estimated. This avoids the difficult problem of density estimation in the case where data is sparse in high dimensional situations, whilst EVT estimates the distribution of extreme values. Accordingly, the above description of a specific embodiment is made by way of example only and not for the purposes of limitation. It will be clear to the skilled person that minor modifications may be made without significant changes to the operation described.

What is claimed is:

1. A method for creating a validation template for determining if documents are valid or not, the method comprising:
    scanning a plurality of reference documents, the reference documents comprising examples of members of a class of documents for which validation is to be conducted to determine the conformity of a document to be validated to standards defining a genuine member of the class of documents, with a scanner to generate a digital image comprising an array of pixels, each pixel comprising image data relating to a single grid point of the image for each reference document;

segmenting the digital image for each of the plurality of reference documents into a number of segments utilizing a processor;

processing corresponding segments of each of the plurality of reference document images to determine one or more reference image segments, determination of the reference image segments including analysis of each pixel of each corresponding segment of the plurality of document images in order to develop a feature set representing each reference image segment;

developing a numerical representation of the feature set representing each reference image segment;

defining acceptance criteria for each reference segment indicating allowable deviation for a corresponding segment of a genuine document, the criteria being based on variations between feature sets among the corresponding image segments;

processing the reference image segments to generate a reference template comprising the numerical representation of the feature set representing each reference image segment and the acceptance criteria for each reference image segment, generation of the reference template further comprising generating a set of rules governing the acceptance or rejection of a document as a whole based on which segments of the document meet or fail to meet the acceptance criteria for their corresponding reference image segments; and generating a validation template by optimizing the reference template by adjusting the number of segments to achieve a desired tradeoff between non-zero false negative and false positive acceptance rates.

2. A method as claimed in claim 1, wherein the step of processing corresponding segments of the plurality of reference document images includes classifying corresponding segments of each image to determine one or more reference segment classification parameters for each segment.

3. A method as claimed in claim 2, further comprising defining a threshold for each reference segment classification parameter.

4. A method as claimed in claim 2, wherein the step of classifying includes using a one-class classifier.

5. A method as claimed in claim 4, wherein the one-class classifier uses a parametric $D^2$ test or a semi-parametric test based on a mixture of Gaussians.

6. A method as claimed in claim 1, wherein optimizing includes determining a preferred combination of segments for use in a validation process.

7. A method as claimed in claim 6, wherein the preferred combination of segments is the combination that provides a minimum number of false acceptances.

8. A method as claimed in claim 6, wherein optimizing includes using a stochastic algorithm.

9. A method as claimed in claim 8, wherein using a stochastic algorithm includes using a genetic algorithm that is adapted to (i) initialize a random population of n chromosomes, (ii) perform crossover and mutation operations to create another n offspring, (iii) carry out a validation operation, and calculate a fitness for each chromosome, (iv) select n chromosomes with the best fitness among all the parents and offspring as the next generation, and (v) if convergent or over a preset maximum number of iteration steps then stop, otherwise go to step (ii).

10. A method as claimed in claim 1, wherein the reference documents include counterfeit documents.

11. A system for developing a validation template, the system comprising:

means for segmenting each one of a plurality of images of reference documents, the reference documents comprising examples of members of a class of documents for which validation is to be conducted to determine the conformity of a document to be validated to standards defining a genuine member of the class of documents, the reference documents exhibiting characteristics against which the document to be validated is to be examined, each image comprising an array of pixels, each pixel comprising image data relating to a single grid point of the image, each image being segmented in a like manner into a plurality of segments;

means for processing corresponding segments of each of the plurality of images to determine a reference image segment, determination of the reference image segment including analysis of each pixel of each corresponding segment of the plurality of document images in order to develop a feature set representing the reference image segment;

means for developing a numerical representation of the feature set representing reference image segment;

means for defining acceptance criteria for each reference segment indicating allowable deviation for a corresponding segment of a genuine document, the criteria being based on variations between feature sets among the corresponding image segments;

means for processing the reference image segments to generate a reference template comprising the numerical representation of the feature set representing each reference image segment and the acceptance criteria for each reference image segment, generation of the reference template further comprising generating a set of rules governing the acceptance or rejection of a document as a whole based on which segments of the document meet or fail to meet the acceptance criteria for their corresponding reference image segments; and means for generating a validation template by optimizing the reference template by adjusting the number of segments to establish a desired tradeoff between non-zero false positive and false negative acceptance rates.

12. A system as claimed in claim 11, wherein the means for processing the corresponding image segments includes means for classifying the segment image data and defining a threshold for a reference segment classification parameter.

13. A self-service terminal comprising:

means for segmenting each one of a plurality of images of reference documents, the reference documents comprising examples of members of a class of documents for which validation is to be conducted to determine the conformity of a document to be validated to standards defining a genuine member of the class of documents, the reference documents exhibiting characteristics against which the document to be validated is to be examined, each image comprising an array of pixels, each pixel comprising image data relating to a single grid point of the image, each image being segmented in a like manner into a plurality of segments;

means for processing corresponding segments of each of the number of images to determine a reference image segment, determination of the reference image segment including analysis of each pixel of corresponding segment of the plurality of image segments in order to develop a feature set representing the reference image segment means for developing a numerical representation of the feature set representing each reference image segment;

means for defining acceptance criteria for each reference segment indicating allowable deviation for a corresponding segment of a genuine document, the criteria being based on variations between feature sets among the corresponding image segments;

means for processing the reference image segments to generate a reference template comprising the numerical representations of the feature set representing each reference image segment and the acceptance criteria for each reference image segment, generation of the reference template further comprising generating a set of rules governing the acceptance or rejection of a document as a whole based on which segments of the document meet or fail to meet the acceptance criteria for their corresponding reference image segments;

generating a validation template by optimizing the reference template by adjusting the number of segments to establish a desired tradeoff between non-zero false positive and false negative acceptance rates; and utilizing the validation template to accept valid banknotes and to reject counterfeits inserted in the self-service terminal.

14. A self-service terminal as claimed in claim 13, wherein the means for processing includes means for classifying the segment image data and defining a threshold for a reference segment classification parameter.

15. A self-service terminal as claimed in claim 13, further comprising means for capturing images of the reference documents.

16. A method for creating a validation template for validating banknotes, the method comprising:

scanning a number N of known acceptable banknotes of a first type with a scanner employing plural detectors to generate digital image data for each of the plurality of known acceptable banknotes;

segmenting the digital image data for each of the plurality of known acceptable banknotes into a number of non-overlapping and equal sized segments $x_1$-$x_n$;

generating a multi-dimensional feature set derived from responses from the plural detectors for each of said segments $x_1$-$x_n$ for each of said banknotes N;

utilizing a classifier to devise a validation template by analyzing the N multi-dimensional feature sets for each of said segments to determine a threshold value $\lambda_1$-$\lambda_n$ for each of said segments $x_1$-$x_n$; and optimizing the validation template by identifying the number of segments n required to establish a desired tradeoff between nonzero false negative FN and false positive FP acceptance rates.

17. The method of claim 16 wherein the plural detectors comprise narrow band sensors which provide responses to reflected red, green, blue and infrared radiation from a surface of a banknote to be tested and the step of generating a multi-dimensional feature set further comprises comparing every pixel of each corresponding segment and storing a difference in intensity for each pair of sensors: red-green, red-blue, red-infrared, green-blue, green-infrared, and blue-infrared, respectively.

18. The method of claim 16 further comprising:
utilizing the optimized validation template in a self service terminal to accept banknotes and reject counterfeits.

19. The method of claim 16 further comprising:
repeating the steps of scanning, segmenting, generating, utilizing and optimizing for a plurality of known counterfeits of a first type to generate a counterfeit rejection template.

20. The method of claim 19 further comprising:
generating additional counterfeit rejection templates as new counterfeits are introduced by counterfeiters.

* * * * *

UNITED STATES PATENT AND TRADEMARK OFFICE
CERTIFICATE OF CORRECTION

PATENT NO. : 7,639,858 B2  Page 1 of 1
APPLICATION NO. : 10/850755
DATED : December 29, 2009
INVENTOR(S) : Ross et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Twenty-first Day of December, 2010

David J. Kappos
*Director of the United States Patent and Trademark Office*